United States Patent [19]

Milette

[11] 3,945,339
[45] Mar. 23, 1976

[54] DIAL INDICATORS WITH INTERCHANGEABLE MOVEMENT

[75] Inventor: Roger C. Milette, Cumberland, R.I.

[73] Assignee: B. C. Ames Company, Waltham, Mass.

[22] Filed: Sept. 5, 1974

[21] Appl. No.: 503,385

[52] U.S. Cl. ........ 116/129 F; 33/172 R; 116/129 R
[51] Int. Cl.² .......................................... G01B 3/22
[58] Field of Search ............... 33/172 R; 73/432 A; 116/129 R, 114 R, 114 H, 129 F

[56] References Cited
UNITED STATES PATENTS

| 1,820,370 | 8/1931 | Aldeborgh | 33/172 R |
| 3,263,503 | 8/1966 | White | 116/129 R |

Primary Examiner—S. Clement Swisher
Assistant Examiner—Denis E. Corr
Attorney, Agent, or Firm—Morse, Altman, Oates & Bello

[57] ABSTRACT

Various sizes of dial indicators are assembled from different size casings and a single size, interchangeable gear train sub-assembly. The sub-assembly includes a gear train mounted to one face of a single size plate which, in turn, is mountable to a gauge casing of any one of a number of different sizes. In a smaller size casing the sub-assembly is mounted directly to the casing while in larger sizes an adapter ring is provided. The use of a single-size, interchangeable gear train sub-assembly reduces inventory requirements, provides uniformity of parts and facilitates servicing of the instruments by mounting the train on one face of a single plate. Adustable stop means are provided for the spindle to limit its return and thereby allow the same spindle to be used with indicators having different operating ranges.

14 Claims, 16 Drawing Figures

U.S. Patent  March 23, 1976  Sheet 2 of 2  3,945,339
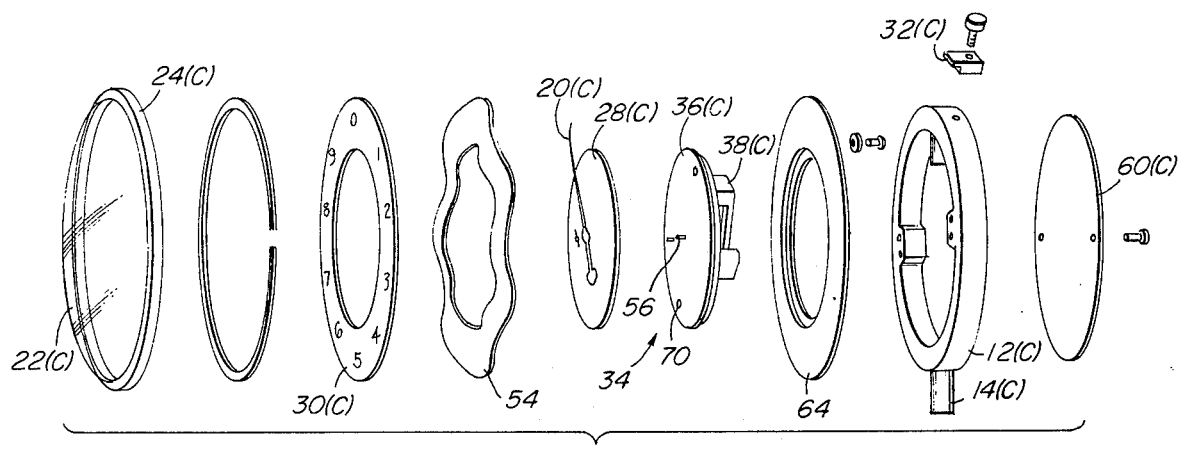
FIG. 3
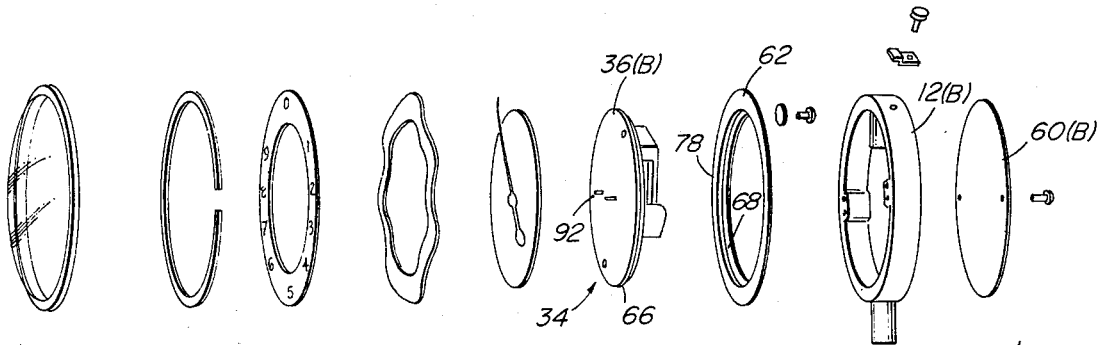
FIG. 4
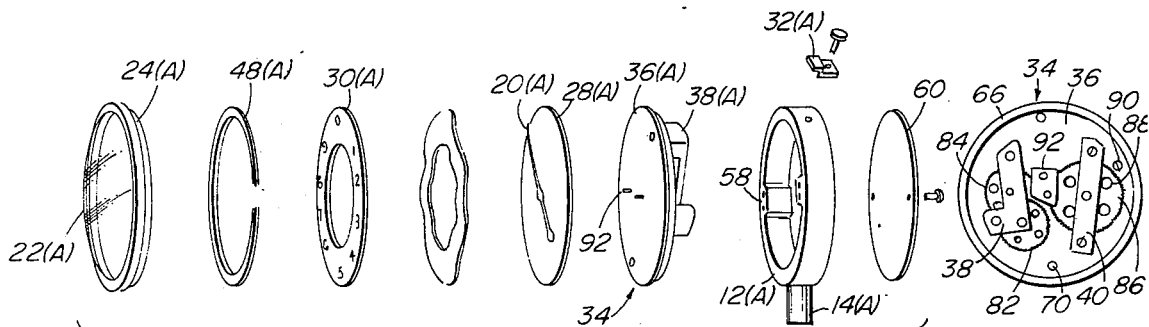
FIG. 5
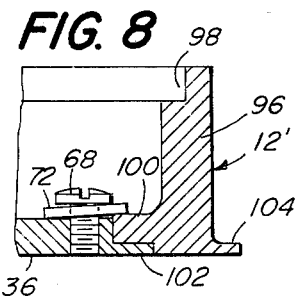
FIG. 10
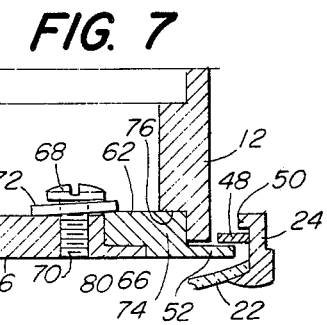
FIG. 7
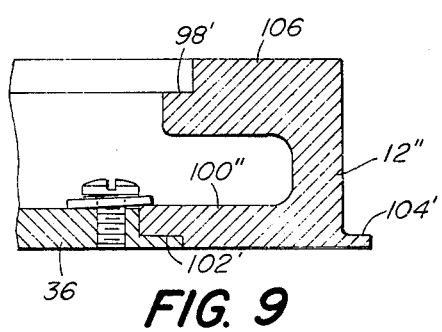
FIG. 9
FIG. 8

DIAL INDICATORS WITH INTERCHANGEABLE MOVEMENT

BACKGROUND OF THE INVENTION

1. Field of the Invention

This invention relates generally to dial indicators and more particularly is directed towards dial indicators of different casing sizes utilizing a single size, interchangeable gear train sub-assembly.

2. Description of the Prior Art

Dial indicators are instruments used to make small, precise measurements for various purposes. In practice, dial indicators are made in a variety of sizes depending upon the particlar task involved. For example, dial indicators may range in size from 2 inches in casing diameters in the number 2 size indicator to a casing 2½ inches in diameter for the number 3 size indicator and to a casing about 3½ inches in diameter for the number 3 size indicator. Heretofore each of these sizes has been fabricated with a gear train that was unique to that size and each size, therefore, was independently assembled from components which, for the most part, were unique to that size. This procedure, therefore, required a rather large inventory of parts insofar as relatively few components were interchangeable between the different sizes. Such an approach not only was expensive because of inventory requirements, but also did not allow for cost savings from volume buying. Further, the assembly procedures made construction both complex and costly.

Accordingly, it is an object of the present invention to provide dial indicators of improved construction and operation. A more specific object of this invention is to provide dial indicators of different sizes employing a single size, interchangeable, gear train sub-assembly. A further object of this invention is to provide a dial indicator with an adjustable stop to limit the return of the indicator spindle and thereby convert the same indicator to operate within different selected ranges.

SUMMARY OF THE INVENTION

This invention features a dial indicator assembly system, comprising a casing of any one of a variety of different sizes and a single size, interchangeable gear train sub-assembly the components of which are mounted on one face thereof and assembled to large sized casings in the preferred embodiment by means of an adapter ring. A spindle of a length selected according to the size of the casing is provided with a plurality of spaced, tapped holes allowing the spindle to receive a set screw at a preselected stop position to vary the range of travel on the spindle.

BRIEF DESCRIPTION OF THE DRAWINGS

FIG. 3 is an exploded perspective view of the instrument illustrated in FIGS. 1*c* and 2*c*.

FIG. 4 is an exploded perspective view of the instrument illustrated in FIGS. 1*b* and 2*b*, FIG. 5 is an exploded perspective view of the instrument illustrated in FIGS. 1*a* and 2*a*, FIGS. 6*a*, *b*, and *c* are detailed rear elevations showing the adjustable spindle stop feature, FIG. 7 is a sectional detailed view showing a mounting arrangement between the gear train sub-assembly, the adapter ring and the housing.

FIG. 8 is a view similar to FIG. 7 but showing a modification of the invention,

FIG. 9 is a view similar to the FIG. 7 but showing a further modification of the invention, and, FIG. 10 is a rear elevation of the gear train sub-assembly.

DETAILED DESCRIPTION OF THE PREFERRED EMBODIMENTS

Figure 1A:
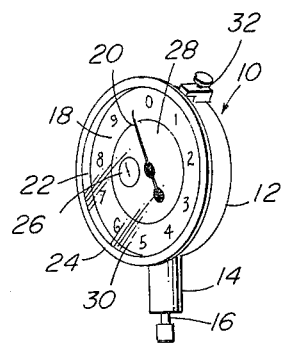
FIGS. 1*a*, *b*, and *c* are front perspective views of different size dial indicators made according to the invention, FIGS. 2*a*, *b*, and *c* are rear perspective views of the FIG. 1 instruments.
Figure 2A:
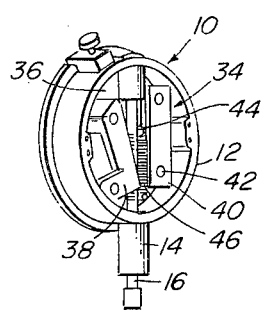

Referring now to the drawings and to FIGS. 1*a* and 2*a* in particular, the reference character 10 generally indicates a dial indicator for a size commonly known as number 2 size and comprised of an outer annular casing 12 having a radial tubular shank 14 to slidably receive a spindle 16 disposed within the casing for reciprocation therein and formed with rack teeth in mesh with driving gears. The indicator also includes a face 18 and a movable indicator needle 20 protected by a transparent front cover 22 held in position by a ring or bezel 24.

In addition to the larger needle 20 a smaller dial and needle 26 may be provided on the same dial face. In the illustrated embodiments, the dial face is made up of two components namely, an inner circular face 28 and an outer graduated annular scale 30. The annular scale 30 connects with the bezel 24 and is rotatable with respect to the fixed face 28 for adjustment purposes. The bezel together with the graduated scale 30 may be locked by means of a clamp 32 mounted to the casing 12.

Referring now to FIG. 2*a*, which shows the back of the dial indicator with the rear cover plate removed, the drive movement is a gear train sub-assembly generally indicated by the reference character 34 and organized about a circular plate 36 on which the gear train is mounted to the rear face thereof. The gear train includes a pair of blocks 38 and 40 mounted by screws 42 to the plate 36 and spaced in side by side relation with sufficient clearance to allow the rack portion of the spindle 16 to extend and reciprocate therebetween. The blocks 38 and 40 are employed to mount driving gears and pinions which engage both the rack teeth of the spindle 16 as well as the indicator needles on the front face of the dial. The block 40 also provides a guideway 43 for a boss 44 mounted to the side of the spindle to prevent rotation thereof. A return spring 46 is tensioned between the boss and a fixed point on the case for returning the spindle to a zero position after a measurement.

Referring now more particularly to FIG. 5, there is shown an exploded perspective view of the components for the indicator of FIGS. 1*a* and 2*a* except for the spindle which has been omitted for the sake of clarity. As shown in FIG. 5, the bezel 24 is connected to the casing by means of a split ring 48 in the manner best shown in FIG. 7. The ring 48 is snapped into position between an inwardly extending annular shoulder 50 formed in the ring 24 and outwardly projecting shoulder 52 on an adapter ring 62 used with the larger size casings. With the small casing a shoulder 66 on the plate 36 is used to retain the ring. After the split ring, the annular graduated scale 30 is mounted and behind this is an annular spring washer 54 slightly corrugated in order to provide a pressure fit between the casing and the graduated scale 30. After the spring washer is mounted the circular dial face 28 which is applied directly over the front face of the circular mounting plate 36 from which projects a stub shaft 56 to which the needle 20 is mounted. Behind the circular dial face 28 is the single size, interchangeable gear train sub-assembly unit 34. The plate 36 is attached to the casing 12 by means of screws passing through drilled openings formed in bosses 58 in the inner side faces of the casing. The casing is then closed by means of a circular back cover plate 60 held in position by screws also threaded into the bosses 58.

Figure 1B:
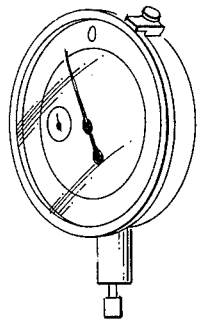
Figure 1C:
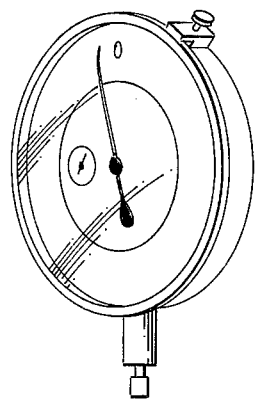
Figure 2B:
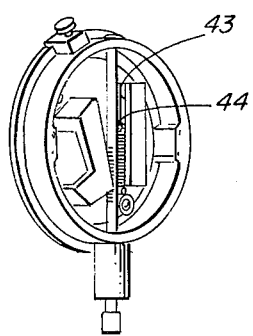
Figure 2C:
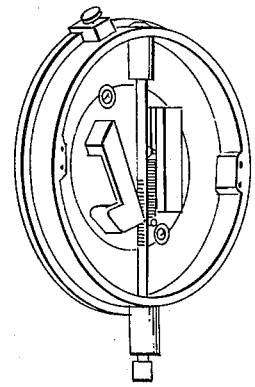

The dial indicators of FIGS. 1 and 2 are of similar outward appearance, the only significant difference being the exterior dimensions. The components, as shown in the exploded views of FIGS. 3, 4 and 5, are also similar in construction although differing in size with the exception of the gear train sub-assemblies 34 including the dial face 28 which, as may be viewed in FIGS. 2, 3, 4 and 5, are all of the same size. In this fashion, only one size gear train sub-assembly and dial face need be provided for all size indicators since they may be freely substituted one with the other.

In the illustrated embodiment of the invention, the gear train sub-assembly 34 is adapted for use with the larger sized dial indicators of FIGS. 1b and 1c. 2b and 2c and FIGS. 3 and 4 by means of an adapter ring 62 for the intermediate size of FIG. 3. In all of the dial indicators the same size interchangeable gear train sub-assembly 34 is employed. The sub-assembly is organized about the plate 36 which typically is on the order of 2⅛ inches in diameter. This dimension is only by way of illustration and obviously may be increased or decreased as desired. However, for the indicators such as shown, the dimension will be the same for all gear train sub-assemblies irrespective of the size of the dial indicator to which it is fitted. The plate 36 is formed with an annular flange 66 about its outer periphery dimensioned to fit snugly into engagement with an annular seat 68 formed on the forward inner face of the adapter ring 62 as best shown in FIG. 7. The integral flange 66 not only serves to center the plate 36 with respect to the adapter ring but also serves to engage the split ring 48a of the FIG. 5 embodiment where no adapter ring is required and the plate 36 mounted directly to the casing 12. In any event, the plate 36 has a thickness slightly less than the thickness of the adapter ring 62 so that the plate 36 may be snugly fastened to the adapter ring by means of a screw 68 threaded into a tapped hole 70 and passing through a washer 72. The tapped hole 70 is close to the periphery of the plate to allow the washer 72 to span the joint between the edge of the plate and the rear face of the adapter ring as best shown in FIG. 7. As may be seen in FIG. 7, the washer 72 is in a slightly tilted position when the screw 68 is tightened in place. In practice, a clearance between the two rear faces namely, the inner face of the adapter ring and the face of the plate, is on the order of 0.005 inch – 0.0008 inch. Again, this is only by way of example and appropriate clamping effects may be achieved with different dimensions.

The adapter ring 62 is formed with a central body portion 74 the width of which is determined by the size of the casing to which it is to be fitted. In any event, the inside diameter of all of the adapter rings is the same insofar as the adapter ring must fit all gear train sub-assemblies 34 which are all of the same diameter. The outside diameter of the ring will vary according to the size of the casing to which it is to be fitted. In each instance the adapter ring is formed with an integral flange 52 which is of an outside diameter greater than that of the casing in order to lock with the split ring 48 by which the bezel ring 24 is mounted. The casing 12 is formed with an annular shoulder 76, in which the adapter ring is seated and secured by screws threaded through the casing bosses 58 into pre-formed tapped openings 78 formed in the adapter ring.

The adapter ring is formed with an annular groove 80 about its inner forward face corresponding in width and depth to the plate flange 66 so that the forward face of the assembled ring and plate will be flush as may be seen in FIG. 7.

As best shown in FIG. 10 the components of the gear train sub-assembly 34 are all mounted on the same side of the supporting plate 36 namely, the back face thereof. In the illustrated embodiment, a three gear drive arrangement is utilized although a different number of gears may be employed depending upon the particular application. In FIG. 10 the blocks 38 and 40 are spaced apart in near parallel relation to allow room for the rack portion of the spindle 16 to extend therebetween. The spindle teeth mesh with a pinion which, in turn, rotates gears 82, 84 and 86 mounted between the blocks 38 and 40 and the plate 36. A coil spring 88 is provided to return the gears to the start position and, in the illustrated embodiment, the spring 88 is secured at one end to a post 90 and at the other end engages the gear 86. The stub shaft 86 is shown pivotally mounted to a center block 92 and carries a small pinion gear meshing with the larger gear 86 to drive the stub shaft located at the center of the plate. The illustrated embodiment includes a second stub shaft 92 offset from the center for use in driving the pointer for a secondary dial 26. The shaft 92, in this instance, is driven directly by the gear 86.

Servicing of the parts of the gear train sub-assembly 34 is simplified by all of the functional components being mounted on one face of the plate where they are readily available for inspection and repair and may be removed as a unit from the dial indicator.

Referring now more particularly to FIG. 8 there is illustrated a modification of the invention and, in this embodiment, a casing 12', similar in size to the casing 12b of FIG. 4 has an annular cylindrical body portion 96 formed with an inner rearwardly facing annular groove 98 as in the principal embodiment to receive the back cover 60. In this embodiment, however, the adapter ring 62 (or 64) is eliminated and the function of the adapter ring is accomplished by means of a flange 100 formed integral with the casing 12' and extending inwardly from the front portion of the casing for a distance equal to the diameter, at the shoulder, of the gear train sub-assembly plate 36. The flange 100 is formed with an outwardly facing annular groove 102 to receive the flange 66 of the plate 36 assembled as shown in FIG. 8. As before, the flange 100 is thicker than the plate 36 in order to allow the mounting screw 68 to clamp the washer 72 in a binding position in the manner shown. In addition to the inwardly extending flange 100, the forward part of the casing 12 is also shown with an outwardly extending flange 104 which provides means for locking the bezel 24 by means of the split ring 48 as suggested in FIG. 7. While the FIG. 8 embodiment shows a casing with a flange 100 of a width corresponding with the flange of the FIG. 4 adapter ring obviously a larger size casing can be provided with a flange of even greater width depending upon the particular casing size. In either event, the casing of the type in FIG. 8 eliminates the need of an adapter ring and further simplifies assembly while reducing inventory requirements.

Referring now to FIG. 9 of the drawings, there is illustrated a further modification of the invention, and, in this embodiment a casing 12" is formed with a forward and inwardly extending flange 100' similar to that of the FIG. 8 embodiment along with an outer locking flange 104' and a groove 102'. In the FIG. 9 embodiment the casing size corresponds generally with that of the FIG. 3 instrument. The flange 100' eliminates the adapter ring 64 of FIG. 3 since it provides a direct mounting for the plate 36. It will be understood that the inside diameter of the flange 100' corresponds with the outside diameter at the shoulder of the plate 36 as shown in FIG. 8. However, in this embodiment the casing 12" is formed with a rear, inwardly extending wall or flange 106 having a width generally corresponding with the width of the flange 100'. The rear wall 106 is formed with a groove 98' to receive the circular cover plate 60. The FIG. 9 embodiment, by virtue of the rear wall 106 allows for the same size rear cover plate 60 to be used interchangeably with different size casings. With this arrangement several different sizes of casings may use a single size gear train sub-assembly and a single size rear cover plate. This further reduces inventory requirements and results in an extremely strong and durable casing for the assembled indicator.

Figure 6A:
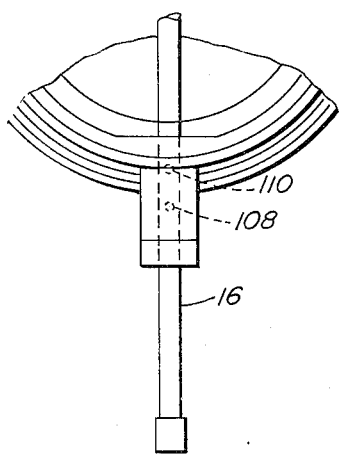
Figure 6B:
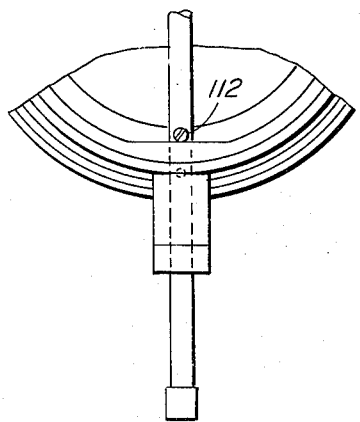
Figure 6C:
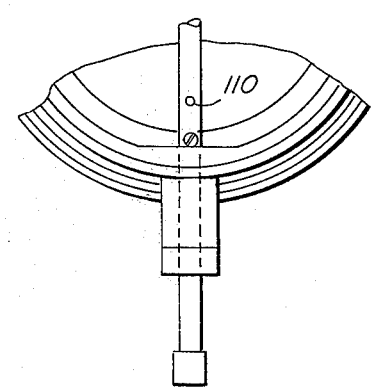

Referring now to FIGS. 6a, b and c, there is illustrated a further modification of the invention and, in this embodiment, means are provided for readily altering the operating range of the indicator spindle. In practice, dial indicators are made for specific uses in which the measurement to be made will be within a specified range and, customarily, the user will purchase an indicator having a specific range of travel for the spindle. Typically, the spindle of one indicator may have a 1 inch operating range while another indicator may be selected to move in a range of ¾ inch while still another may have an operating range of ½ inch. Heretofore, dial indicators have been provided with spindles in different lengths as a means for determining operating ranges. Here again, prior practice has necessitated the maintenance of a large inventory of different sized parts as well as a large inventory of assembled units in different sizes and operating ranges. In accordance with the present invention, the inventory requirements are sharply reduced by using a single size spindle 16 of a given size indicator and forming in the spindle a plurality of spaced, tapped holes 108 and 110 in the lower mid-portion thereof to receive a stop screw 112 which may be screwed into either of the tapped holes 108 or 110, depending upon the desired range of travel. If the spindle is to function over its full range, the screw is removed as shown in FIG. 6a. Typically, such an arrangement will allow the spindle to travel over a 1 inch range. In FIG. 6b the stop screw 112 has been connected to the upper hole 110 and, when so mounted, limits the downward stroke of the spindle by engaging the inner wall of the casing. In this arrangement, the spindle typically may travel over a ¾ inch range. If the range is to be limited to a ½ inch stroke as suggested in FIG. 6c the stop screw 112 is threaded into the lower hole 108. Thus, a single spindle may be readily adjusted to any one of several functioning ranges.

The dial indicators disclosed herein substantially reduce the number of parts needed to be carried in inventory and greatly facilitates the assembly as well as servicing of the instruments since the gear train sub-assembly may be removed as a unit from the casing to which it is mounted without the need of removing the spindle. Since all of the functioning components are mounted to one face only of the gear train sub-assembly plate the sub-assembly may be separated from the spindle and out of the casing as a unit for easy service.

Having thus described the invention, what I claim and desire to obtain by Letters Patent of the United States is:

1. A dial indicator, comprising
   a. a generally cylindrical casing formed with an internal cavity and at least one opening in the walls thereof,
   b. a gear train sub-assembly mountable to said casing through said opening,
   c. said sub-assembly including a substantially flat circular plate continuous to said casing and a gear movement mounted to one face only of said plate,
   d. means mounting said plate to said casing across said opening with said movement disposed within said cavity,
   e. a graduated circular dial having a diameter substantially equal to the diameter of said casing mounted to the other face of said plate,
   f. an indicator needle rotatably mounted to said other face and in driving engagement with said gear movement, and
   g. a spindle formed with rack teeth mounted in said casing for reciprocating motion relative thereto and in driving engagement with said gear train, said spindle having at least one end thereof projecting through said casing.

2. A dial indicator according to claim 1 including adjustable stop means engageable with said spindle for selectively varying the range of travel of said spindle.

3. A dial indicator according to claim 2 wherein said stop means includes a plurality of longitudinally spaced tapped sockets formed in said spindle and a stop screw mountable therein.

4. A dial indicator according to claim 1 wherein said mounting means includes an annulus formed with a central opening conforming to the outline of said plate for assembly therewith.

5. A dial indicator according to claim 4 wherein said annulus is internal with said casing.

6. A dial indicator according to claim 5 wherein said casing is formed with an integral rear annulus wall of a width generally corresponding to said annulus said wall being formed with an outwardly facing groove about the inner edge thereof and a rear cover plate detachably mounted to said wall and within said groove.

7. A dial indicator according to claim 4 wherein said annulus is separable from said casing and from said plate.

8. A dial indicator according to claim 4 wherein said plate is formed with an outer peripheral flange and said annulus is formed with cooperating annular groove adjacent the central opening and in the outer face thereof for mating engagement with said flange.

9. A dial indicator comprising
   a. a casing formed with an internal cavity and at least one opening in the walls thereof,
   b. a gear train sub-assembly mountable to said casing through said opening,
   c. said sub-assembly including a plate and a gear movement mounted to one face only of said plate, d. means mounting said plate to said casing across said opening with said movement disposed within said cavity,
e. a graduated dial mounted to the other face of said plate,
f. an indicator needle rotatably mounted to said other face and in driving engagement with said gear movement, and,
g. a spindle formed with rack teeth mounted to said casing for reciprocating motion relative thereto and in driving engagement with said gear train, said spindle having at least one end thereof projecting through said casing,
h. said mounting means including an annulus formed with a central opening conforming to the outline of said plate for assembly therewith,
i. said plate being formed with an outer peripheral flange and said annulus being formed with a cooperating annular groove adjacent the central opening and in the outer face thereof for mating engagement with said flange,
j. said annulus being thicker than said plate, said plate being formed with a plurality of tapped holes adjacent the periphery of said plate, a screw mounted in each of said holes and a washer mounted to each of said screws and spanning the joint between said annulus and said plate in clamping engagement.

10. A dial indicator according to claim 9 wherein said annulus is formed with a peripheral shoulder extending outwardly beyond the periphery of said casing, a transparent cover mounted over the dial face of said indicator, a bezel ring mounted to the periphery of said transparent cover and formed with an inner annular groove extending over said shoulder and a split locking ring disposed between said shoulder and bezel for locking one to the other.

11. A dial indicator according to claim 9 including adjustable stop means engageable with said spindle for selectively varying the range of travel of said spindle.

12. A dial indicator according to claim 11 wherein said stop means includes a plurality of longitudinally spaced tapped sockets formed in said spindle and a stop screw mountable therein.

13. A dial indicator according to claim 9 wherein said annulus is integral with said casing.

14. A dial indicator according to claim 9 wherein said annulus is separable from said casing and from said plate.

* * * * *